Aug. 1, 1961   M. A. McCOY   2,994,835
STABILIZED REGENERATIVE Q MULTIPLIER CIRCUIT OR THE LIKE
Filed Jan. 27, 1958                                2 Sheets-Sheet 1

MARCUS A. McCOY
*INVENTOR.*

BY
HIS ATTORNEY

MARCUS A. McCOY
*INVENTOR.*

United States Patent Office 2,994,835
Patented Aug. 1, 1961

2,994,835
STABILIZED REGENERATIVE Q MULTIPLIER CIRCUIT OR THE LIKE
Marcus A. McCoy, Reseda, Calif., assignor to Hoffman Electronics Corporation, a corporation of California
Filed Jan. 27, 1958, Ser. No. 711,369
3 Claims. (Cl. 330—89)

This invention is related to Q multipliers and, more particularly, to an improved regenerative Q multiplier having characteristics of high stability.

In the past, many types of Q multiplier circuits have been designed for employment in electronic circuits for the purpose of simultaneously providing amplification and selectively in a comparatively few number of stages. Invariably certain problems are encountered which render Q multipliers presently in use deficient in some respects. The principal difficulty in the case of regenerative Q multipliers is that of variation in the degree of regeneration exhibited by the Q multiplier if variations in anode and filament voltages exist. Another difficulty centers in the fact that in the case of present Q multiplier circuits fluctuations in regeneration are experienced as the Q multiplier is being tuned over a wire range of frequencies. In addition, fluctuations in tube parameters in present circuits produce unwanted fluctuations in Q multiplication.

Therefore, it is an object of the present invention to provide a new and useful stabilized regenerative Q multiplier circuit.

It is a further object of the present invention to provide a regenerative Q multiplier which will exhibit a minimum of fluctuation in Q multiplication despite variations in operating voltages, changes in tube parameters, and deviations in operating frequency.

According to the present invention an oscillatory circuit serves jointly as an output circuit of a first tube stage exhibiting a positive resistance and as an input circuit of a regenerative tube stage exhibiting a negative resistance. The anodes of the vacuum tubes associated with each stage are coupled in parallel to a source of positive voltage. The filaments of these tubes are also parallel-coupled to a filament voltage source. Q variation tendencies of the oscillatory circuit caused by unwanted fluctuations in circuit parameters of the positive resistance tube stage, owing to fluctuations in anode voltage, filaments voltage, or changes in tube parameters, are counter-balanced by fluctuations produced in the regenerative tube stage and vice versa, and constant Q is maintained thereby.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
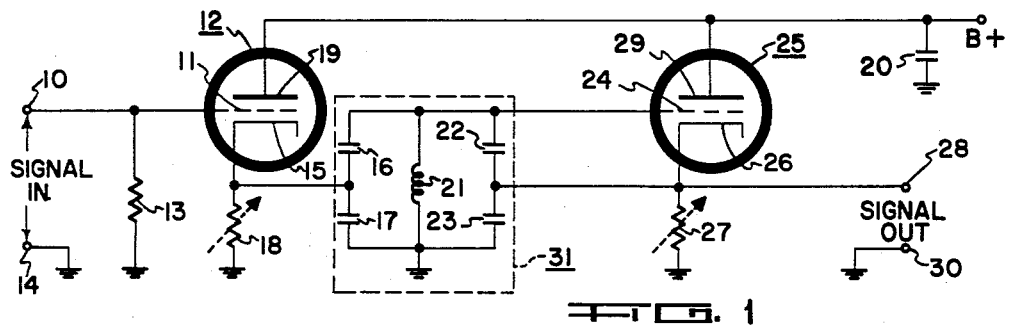
FIGURE 1 is a schematic diagram of a first embodiment of a stabilized Q multiplier according to the present invention.

In FIGURE 1 input terminal 10 is connected to control electrode 11 of vacuum tube 12 and also to ground through resistor 13. Input terminal 14 is grounded. Cathode 15 of vacuum tube 12 is connected to the junction of capacitors 16 and 17 and also to ground through resistor 18. Anode 19 of vacuum tube 12 is coupled through R-F bypass capacitor 20 to ground and also to a source of positive voltage (B+). Inductor 21, which may be permeability tuned, is coupled across capacitors 16 and 17 and also across capacitors 22 and 23. The junction of inductor 21 and capacitors 16 and 22 is directly connected to control electrode 24 of vacuum tube 25. Cathode 26 of vacuum tube 25 is connected to the junction of capacitors 22 and 23, to ground through cathode resistor 27, and to output terminal 28. Anode 29 of vacuum tube 25 is coupled to R-F ground through capacitor 20 and also to a source of positive voltage (B+). Output terminal 30 is maintained at ground potential.

The circuit of FIGURE 1 operates as follows. Input terminals 10 and 14 are adapted for coupling to a signal source. The parallel resonant circuit composed of capacitors 16, 17, 22 and 23 and inductor 21 is tuned to the input signal frequency. Capacitors 16 and 17 of parallel resonant circuit 31 form a capacitor divider circuit. Inductor 21 and capacitors 22 and 23 form a Colpitts circuit for vacuum tube 25. Let it be assumed that any incremental changes in the anode voltages, filament voltages, or transconductances of vacuum tubes 12 and 25 are equal in magnitude and are capable of being represented as equivalent incremental changes in resistances across resistors 18 and 27. If the effective Q of parallel resonant circuit 31 is plotted against the effective value of resistor 27, a curve similar to the one shown in FIGURE 2 results.

Figure 2:
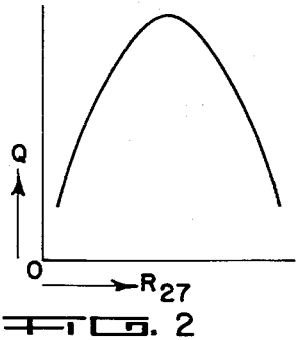
FIGURE 2 is a graph of Q plotted against the resistive component of the cathode impedance of the regenerative tube stage in FIGURE 1.

As is seen from FIGURE 2, when resistor 27 is at its lowest value, the shunting effect of resistor 27 across capacitor 23 of parallel resonant circuit 31 will reduce the Q of parallel resonant circuit 31 to its lowest value. The foregoing will be true despite the large transconductance of vacuum tube 25 for low values of cathode resistance since the feed-back path is effectively eliminated by the short-circuiting, in effect, of cathode 26 to ground. As the value of resistor 27 increases, the transconductance of tube 25 will decrease slightly, but not so much as to lessen or detract from the decrease in the shunting effect of resistor 27 across capacitor 23. The Colpitts-type circuit of parallel resonant circuit 31 will begin to appear to be regenerative and the effective Q will commence to rise to some optimum or peak value. Further increases in resistance of resistor 27 will cause the transconductance of vacuum tube 25 to fall appreciably so that for increasing resistance values of resistor 27 the Q will drop substantially. Accordingly, the curve shown in FIGURE 2 appears to take the form approximating an inverted parabola. Corresponding incremental changes in the resistance value of resistor 18, in the cathode circuit of vacuum tube 12, will produce opposite effects, as is shown in the graph of FIGURE 3.

Figure 3:
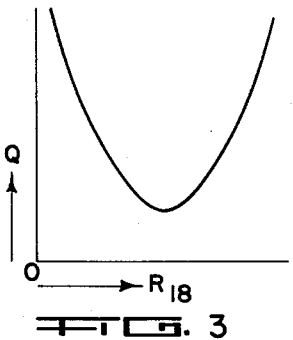
FIGURE 3 is a graph of Q plotted against the resistive component of the cathode impedance of the positive resistance tube stage shown in FIGURE 1.

In FIGURE 3 the effective circuit Q of parallel resonant circuit 31 is plotted against increasing resistance values of cathode resistor 18. If the value of resistor 18 approaches either zero or infinity, i.e., if the resistance of resistor 18 is either very small or very large, then the effective Q of parallel resonant circuit 31 will be high and determined solely by the circuit Q's of inductor 21 and capacitors 16, 17, 22 and 23. For intermediate values of resistance, resistor 18 in shunting capacitor 17 will load down parallel resonant circuit 31 so that the circuit Q of parallel resonant circuit 31 will experience a marked decrease. It has been shown experimentally that the shape of the curve in FIGURE 3 is roughly equivalent to the shape of the curve in FIGURE 2, except that it is inverted. It thus appears that when the two effects are added, effective Q of parallel resonant circuit 31 will remain substantially constant.

Figure 4:
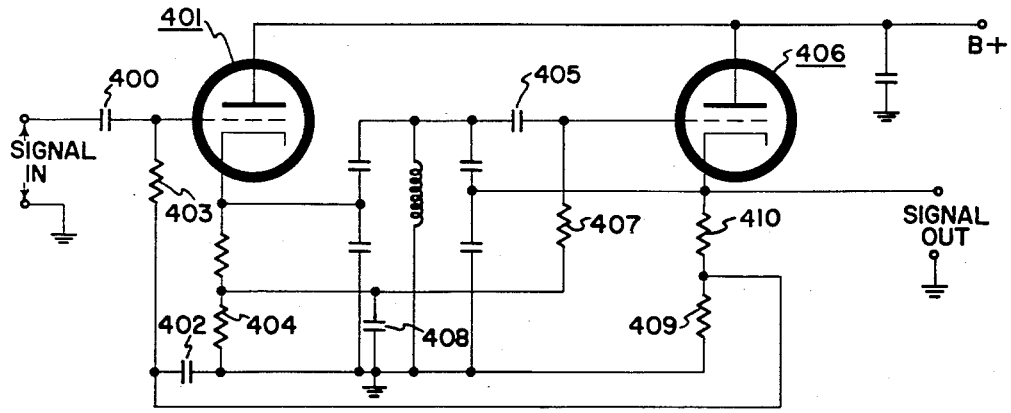
FIGURE 4 is a schematic diagram of a stabilized Q multiplier incorporating the basic circuit shown in FIGURE 1.

The basic circuit of the first embodiment of the subject invention as shown in FIGURE 1 is shown in FIGURE 4 with the addition of a few other components, for improved circuit stability. Capacitor 400 serves as an input coupling capacitor to vacuum tube 401. Capacitor 402 is coupled between resistors 403 and 404. Capacitor 405 is an input coupling capacitor to vacuum tube 406. Input load resistor 407 associated with vacuum tube 406 is coupled through capacitor 408 to ground. Resistor 409 is coupled between resistor 410 and ground.

The circuit shown in FIGURE 4 operates in a manner identical to the circuit of FIGURE 1 with the following additions. Resistors 404 and 409 in the cathode circuits of vacuum tubes 401 and 406, respectively, serve to load properly their respective tubes so that deviation in parameters of one tube from another will be effectively counterbalanced. Capacitors 402 and 408 are A.C. bypass capacitors.

Figure 5:
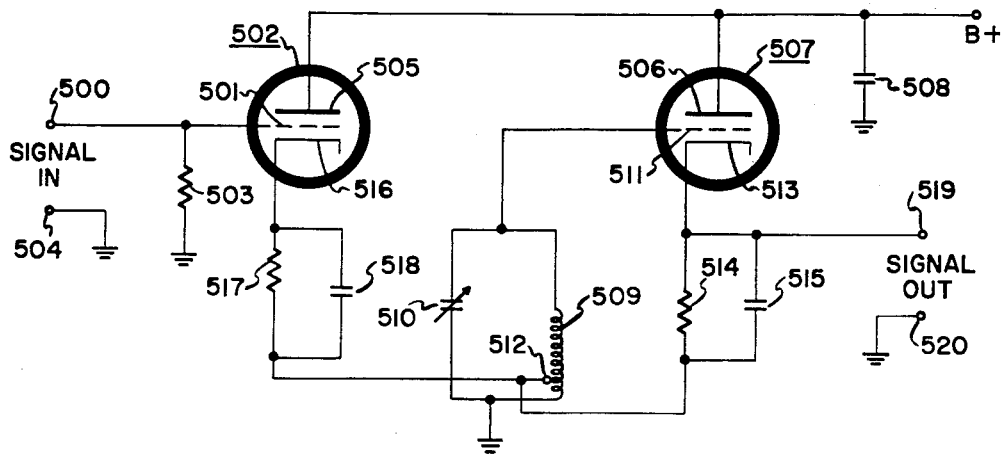
FIGURE 5 is a schematic diagram of a second embodiment of a stabilized Q multiplier according to the present invention.

In FIGURE 5, input terminal 500 is directly connected to control electrode 501 of vacuum tube 502 and also to ground through input resistor 503. Input terminal 504 is grounded. Anode 505 of vacuum tube 502 and anode 506 of vacuum tube 507 are coupled to a source of positive voltage (B+) and also to ground through R-F bypass capacitor 508. Inductor 509 and variable capacitor 510 form a Hartley-type parallel resonant circuit and are coupled between ground and control electrode 511 of vacuum tube 507. To tap 512 of inductor 509 are coupled cathode 513, through resistor 514 and capacitor 515, and also cathode 516, through resistor 517 and capacitor 518. Output terminal 519 is connected directly to cathode 513 of vacuum tube 507. Output terminal 520 is maintained at ground potential.

The circuit shown in FIGURE 5 represents an additional embodiment of the present invention and may be modified by the addition of other circuit components as is indicated in the circuit of FIGURE 4. The circuit of FIGURE 5 operates in substantially the same manner as the circuit of FIGURE 1 with the exception, of course, that the Colpitts-type regenerative circuit of FIGURE 1 is replaced by the Hartley-type circuit comprising inductor 509 and variable capacitor 510.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A stabilized regenerative Q-multiplier circuit comprising, in combination, a first and second stage each including an electron discharge device having an anode, a cathode and a control electrode; means for coupling a source of A.C. signals to the control electrode of the first stage, a resistive load impedance between the cathode electrode of said first stage and a point of reference potential, a parallel resonant circuit tuned to a predetermined frequency and having a first end terminal connected to said point of reference potential, a second end terminal, and intermediate terminal means dividing said resonant circuit into sections across which appear portions only of the total voltage across said resonant circuit; a source of anode voltage supply connected from the anodes of both said devices to said point of reference potential; means coupling at least a portion of the voltage appearing across said load impedance between said intermediate terminal means and said point of reference potential, to constitute said first stage as of positive resistance type to provide a variation in effective circuit-Q which is substantially parabolic with reference to increasing values of the potential across said load impedance; a second resistive load impedance between the cathode of said second stage and said point of reference potential, means for connecting the control electrode and cathode of said second stage respectively to said second end terminal and said intermediate terminal means, to constitute said second stage as of regenerative negative resistance type to provide a variation in effective circuit-Q which is substantially the inverse of said parabolic variation in effective circuit-Q with reference to increasing values of the potential across said second load impedance; and means for deriving an output signal from the cathode of said second stage; whereby variations in circuit conditions of said stages tending to vary the Q of the multiplier circuit are effectively counterbalanced.

2. A stabilized Q-multiplier circuit in accordance with claim 1, in which said parallel resonant circuit includes an inductance leg and a pair of capacitance legs each including a pair of series-connected capacitors; and in which said intermediate terminal means comprises the common terminals between the capacitors of said capacitance legs.

3. A stabilized Q-multiplier circuit in accordance with claim 1, in which said parallel resonant circuit includes a capacitance leg and an inductance leg comprising a tapped inductance; and in which said intermediate terminal means comprises the tap of said inductance.

References Cited in the file of this patent

UNITED STATES PATENTS

| | | |
|---|---|---|
| 2,068,112 | Rust | Jan. 19, 1937 |
| 2,120,998 | Barber | June 21, 1938 |
| 2,136,664 | Barber | Nov. 15, 1938 |
| 2,456,716 | Lewinter | Dec. 21, 1948 |
| 2,890,290 | Hemphill | June 9, 1959 |